United States Patent
Haacke et al.

(10) Patent No.: US 6,815,889 B2
(45) Date of Patent: Nov. 9, 2004

(54) HIGH-PRESSURE GAS DISCHARGE LAMP

(75) Inventors: Michael Haacke, Aachen (DE); Pieter Postma, Roosteren (NL); Paul Hellwig, Aachen (DE); Juergen Schoeneich, Stolberg (DE); Ralf Muckel, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 31 days.

(21) Appl. No.: 10/301,253

(22) Filed: Nov. 21, 2002

(65) Prior Publication Data

US 2003/0098653 A1 May 29, 2003

(30) Foreign Application Priority Data

Nov. 26, 2001 (DE) .......................... 101 57 621

(51) Int. Cl.$^7$ .................... H01J 17/20; H01J 17/16
(52) U.S. Cl. .................. 313/573; 313/493; 313/634; 313/638
(58) Field of Search .................. 313/568, 570, 313/572, 573, 634, 637, 638, 484, 493, 317, 318.02

(56) References Cited

U.S. PATENT DOCUMENTS

| | | | | |
|---|---|---|---|---|
| 2,961,565 A | * | 11/1960 | Lemmers | 313/573 |
| 3,870,919 A | | 3/1975 | Hellman et al. | 313/220 |
| 3,959,524 A | | 5/1976 | Keeffe | 427/106 |
| 3,963,951 A | | 6/1976 | Ramberg | 313/44 |
| 4,850,499 A | * | 7/1989 | White et al. | 220/2.1 R |
| 5,211,595 A | | 5/1993 | Kowalczyk et al. | 445/26 |
| 5,363,007 A | * | 11/1994 | Fromm et al. | 313/25 |
| 5,528,104 A | | 6/1996 | Kim et al. | 313/573 |
| 5,866,982 A | * | 2/1999 | Scott et al. | 313/634 |
| 6,157,130 A | * | 12/2000 | Omori et al. | 313/634 |
| 6,169,367 B1 | | 1/2001 | Muto et al. | 313/634 |
| 6,495,962 B2 | * | 12/2002 | Uemura et al. | 315/77 |

FOREIGN PATENT DOCUMENTS

| | | | |
|---|---|---|---|
| EP | 1063681 | 12/2000 | H01J/61/12 |
| EP | 1150337 A1 | 4/2001 | H01J/61/12 |
| EP | 1174904 A1 | 6/2001 | H01J/61/30 |

OTHER PUBLICATIONS

Patent Abstracts of Japan; vol. 003, No. 154, (m–085), Dec. 18, 1979, JP54132378A.

* cited by examiner

*Primary Examiner*—Vip Patel
*Assistant Examiner*—German Colón

(57) ABSTRACT

A high-pressure gas discharge lamp (HID [high intensity discharge] lamp) is described which is designed in particular so as to be free from mercury and suitable for use in automobile technology. To achieve improved lamp properties, in particular a substantially equal luminous efficacy compared with lamps of the same power and having a gas filling with mercury, as well as a burning voltage which is as high as possible, a geometry is proposed for the discharge space (2) which raises the temperature of the coldest spot in the lamp to such a degree that the light-generating substances can enter the gas phase to a sufficient extent also without mercury, and in particular in combination with the use of a metal halide as a voltage gradient generator.

13 Claims, 5 Drawing Sheets

Figure 5:
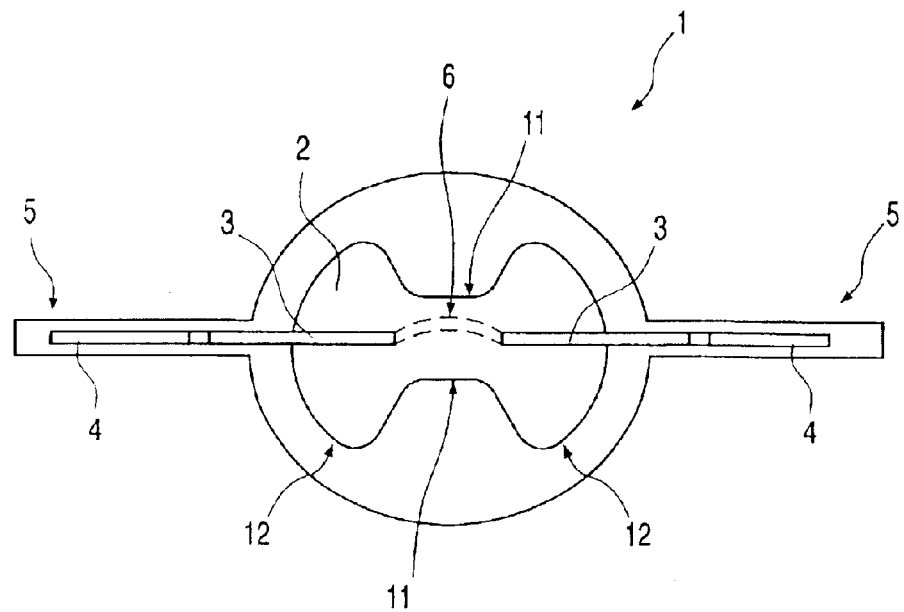

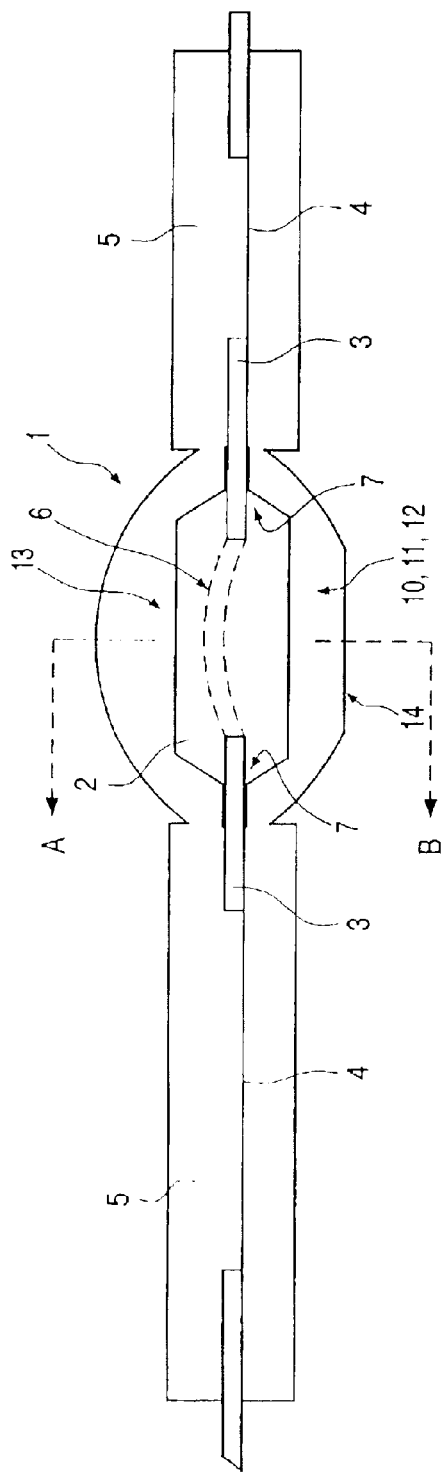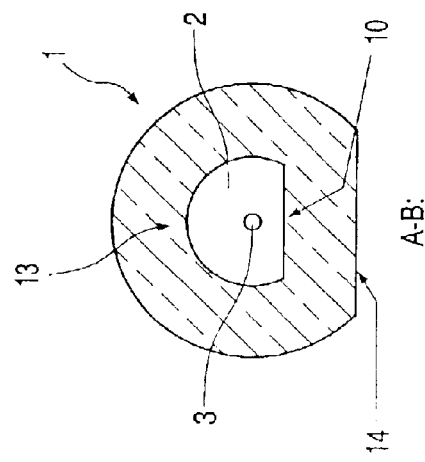
FIG. 1a
FIG. 1b

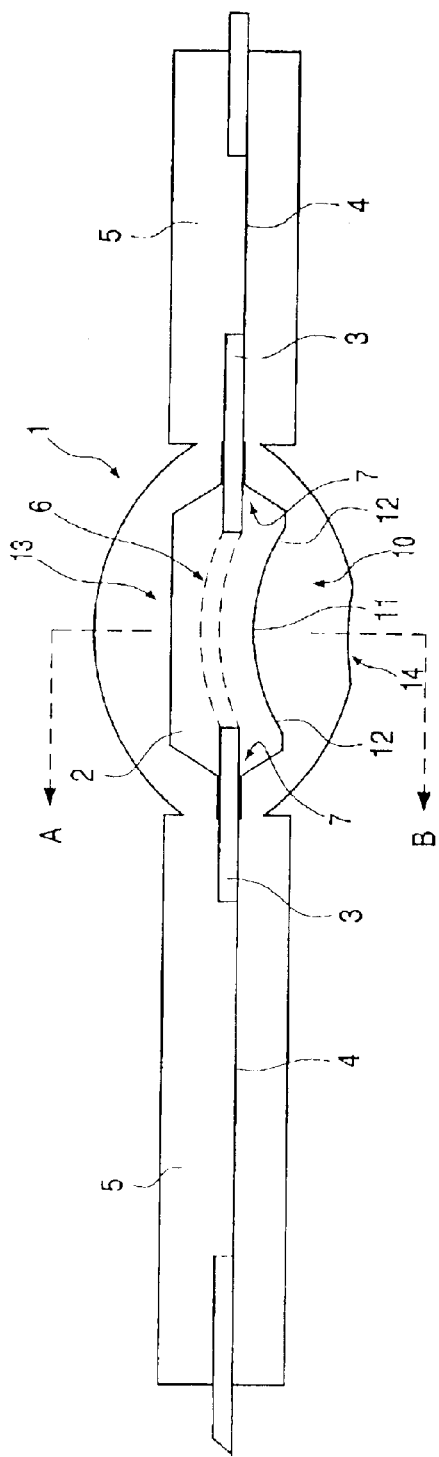
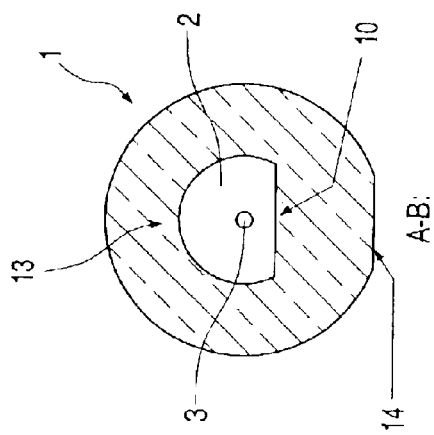
FIG. 2a
FIG. 2b

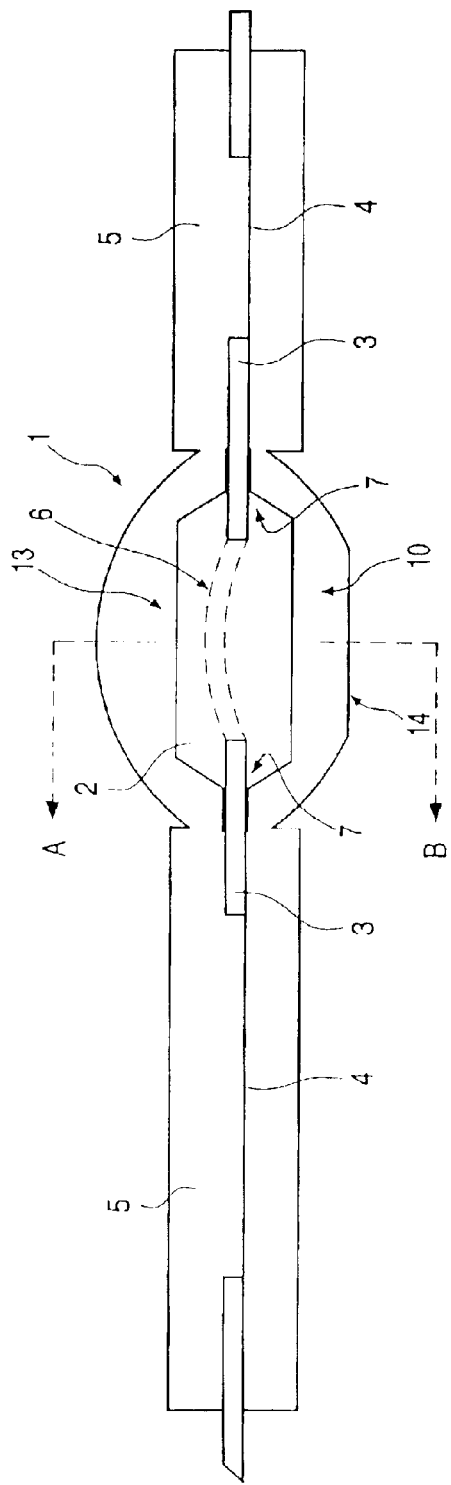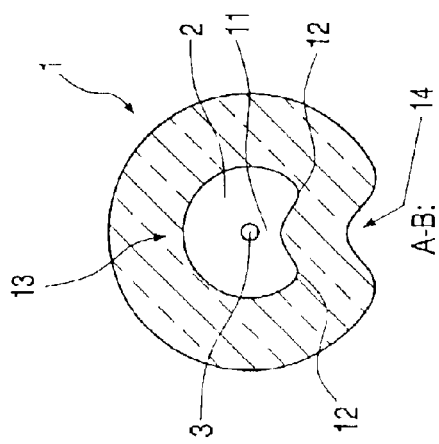
FIG. 3a
FIG. 3b

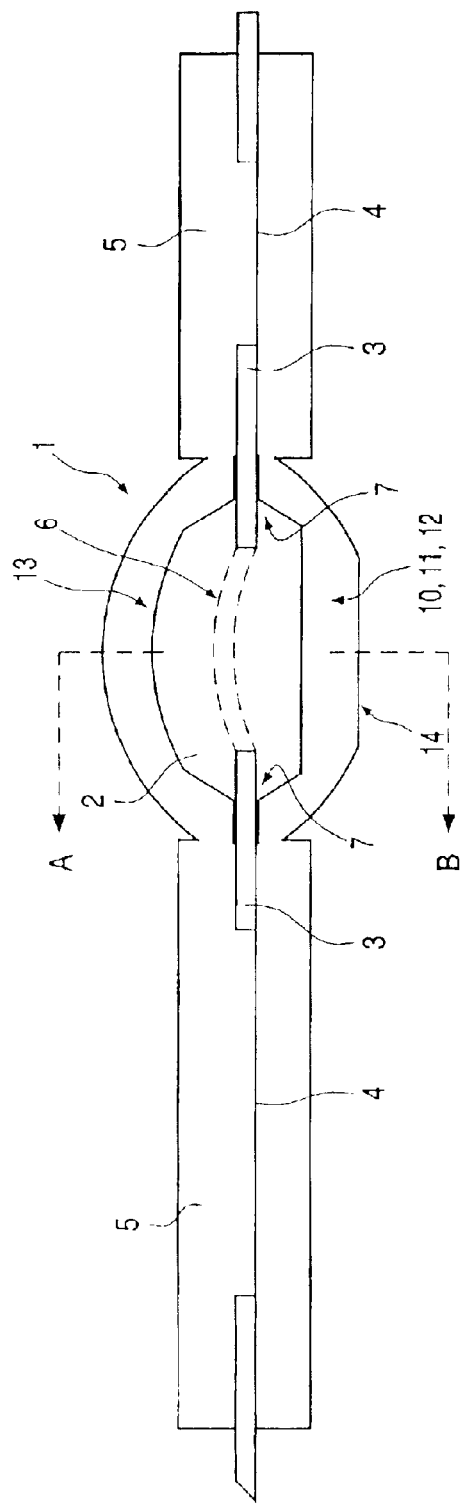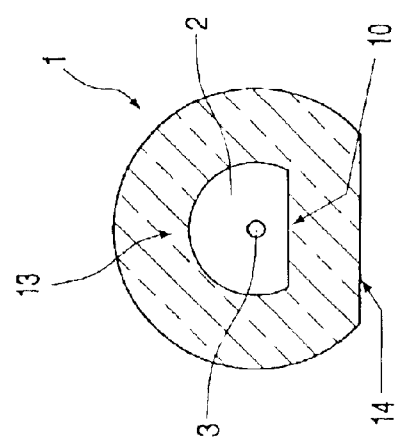
FIG. 4a
FIG. 4b

HIGH-PRESSURE GAS DISCHARGE LAMP

The invention relates to a high-pressure gas discharge lamp (HID [high intensity discharge] lamp) which is in particular free from mercury and suitable for use in automobile technology.

Conventional high-pressure gas discharge lamps contain on the one hand a discharge gas (usually a metal halide such as sodium iodide or scandium iodide) which is the actual light-emitting material (light generator), and on the other hand mercury which primarily serves to form a voltage gradient and has the essential function of enhancing the efficacy and burning voltage of the lamp.

Lamps of this kind have come into widespread use because of their good properties and they are increasingly applied also in the field of automobile technology. It is also partly required in particular for this application, however, that the lamps should contain no mercury for environmental reasons.

EP 1,063,681 describes a discharge lamp in which the use of mercury in the discharge space is dispensed with so as to avoid environmental pollution and to reduce the proportion of ultraviolet radiation. It is further described therein, however, that such lamps cannot be used in motor vehicles because they do not generate the required luminous flux quickly enough after switching on. This problem is to be solved in that the heat capacity and the heat losses of the discharge space are reduced, and in that certain ratios between the internal gas pressure at room temperature on the one hand and the volume of the discharge space and its maximum wall thickness in several respective cross-sectional planes in the discharge space are to be observed.

It is a disadvantage here, however, that a reduced distance between the vessel inner wall and the light arc curved upwards by convection causes the light-generating substances to react with the silicon oxide, in particular in the comparatively hot upper wall region of the discharge vessel, thus leading to an intensified crystallization which shortens lamp life. In addition, such a lamp has a lower luminous efficacy than a lamp containing mercury.

Besides the lower luminous efficacy, there is a further, general problem in lamps without mercury, i.e. that a lower burning voltage and accordingly a higher lamp current are obtained for the same lamp power in continuous operation.

Finally, the application in the field of automobiles means that the constructional situation and the interaction with the reflector are to be taken into account, which means that the external shape of the lamp should remain substantially unchanged.

It is accordingly an object of the invention to provide a high-pressure gas discharge lamp which, with a mercury-free gas filling, is capable of achieving a luminous efficacy which corresponds substantially to that of lamps containing mercury, or whose efficacy in the case of a gas filling with mercury can be further enhanced.

A further object is to provide a high-pressure gas discharge lamp which, also with a gas filling without mercury, has a higher burning voltage than can be normally achieved with lamps free from mercury.

In particular, a high-pressure gas discharge lamp is to be provided by means of which at least one of the two objects mentioned above (higher luminous efficacy and higher burning voltage) can be achieved without the necessity of increasing the lamp power or the maximum thermal load thereon, or enlarging the outer dimensions of the outer bulb of the lamp.

A mercury-free high-pressure gas discharge is also to be provided which has a lumen maintenance usual for motor vehicle applications, i.e. which has a luminous decrement through lamp life which is similar to that of lamps with mercury.

Finally, a high-pressure gas discharge lamp is to be provided which is suitable for use in particular in automobile technology.

The object is achieved, according to claim 1, by means of a high-pressure gas discharge lamp with a discharge vessel which encloses a discharge space with a light-generating substance and with a bottom surface which is in lowermost position in the operational position of the lamp, which bottom surface has a first raised region and at least one second region, wherein the distance of the first region to an arc discharge formed during operation of the lamp is dimensioned such that the light-generating substance collected on said first region enters the gaseous state in a sufficient quantity owing to heating after switching on of the lamp, and wherein the second region is arranged such that it acts as a collector reservoir for the light-generating substance moving about owing to the heating caused by switching-on of the lamp. Such a reservoir is advantageous for several reasons. First, it prevents at least partly that migrating light-generating substances enter the regions of entry locations of the electrodes. Second, such a reservoir ensures that the molten salts disappear substantially from the first region, where they would hamper the emission of light from the lamp owing to reflection and absorption.

The second region may be arranged such here that it is lowered or raised with respect to the first region, or substantially forms a continuation of the first region—in as far as it has a correspondingly large surface area. This arrangement is to be decided on primarily in dependence on the nature and the quantity of the light-generating substance introduced into the discharge vessel, i.e. the evaporation and mobility properties thereof.

A particular advantage of this solution is that said geometry of the discharge space renders it possible to raise the temperature of the coldest spots in the discharge space without the consequence that the maximum temperature (at the upper side in the operational position) and the maximum thermal load on the lamp rise, or that light-generating substances can move into the pinches and cause damage there.

This has among its results that either mercury can be omitted without substitute, or that a different voltage gradient forming material can be used instead of mercury, which material is less damaging to the environment, for example a suitable metal halide, while in all cases the light-generating substances enter the gas phase in sufficient quantities because of the higher temperature of the coldest spots achieved with this geometry, whereby the luminous efficacy of the lamp and its burning voltage are further enhanced. This may also be achieved through the introduction of a rare gas (in particular xenon), by which the gas pressure in the discharge space is raised.

It should be noted here that U.S. Pat. No. 5,211,595 discloses a method of manufacturing a discharge lamp with asymmetrical pinches and with an asymmetrical discharge vessel. The object of this asymmetry, in contrast to the solution according to the present invention, is to achieve a greater distance between the upper region of the discharge vessel and the light arc which is comparatively strongly upwardly curved during operation, so that said region is not heated so strongly. A further object is, in the manufacture of a discharge vessel with such an asymmetry and only a slight curvature in the lower wall region, to avoid cracks in said lower wall region, in which cracks metal halides would accumulate more strongly, and a larger surface is to be provided for facilitating the evaporation of said substances and for improving the photometric properties of the lamp. Finally, this lamp is not free from mercury, nor is it designed for use in automobile technology, so that this publication is not to be regarded as relevant.

The dependent claims relate to advantageous further embodiments of the invention.

The embodiments defined in claims 2 and 3 have the advantage in particular that the manufacture is particularly simple and accordingly inexpensive.

The embodiment defined in claim 4 is particularly suitable for use in motor vehicle headlights.

Claims 5 and 6 relate to voltage gradient forming materials which are to be used in preference to mercury and by means of which a particularly good luminous efficacy of the lamp can be achieved, while claim 7 provides an alternative possibility for achieving this object, and in particular for achieving a higher luminous efficacy and burning voltage.

The embodiment defined in claim 8 achieves a particularly homogeneous temperature rise of the bottom surface, while according to claim 9 the protection of the entry locations of the electrodes and the pinches situated behind them against the light-generating substances can be further improved.

Further details, features, and advantages of the invention will become apparent from the ensuing description of preferred embodiments which is given with reference to the drawing, in which:

FIGS. 1a and 1b diagrammatically show a first embodiment of the invention;

FIGS. 2a and 2b diagrammatically show a second embodiment of the invention;

FIGS. 3a and 3b diagrammatically show a third embodiment of the invention;

FIGS. 4a and 4b diagrammatically show a fourth embodiment of the invention;

FIG. 5 diagrammatically shows a fifth embodiment of the invention; and

Figure 6:
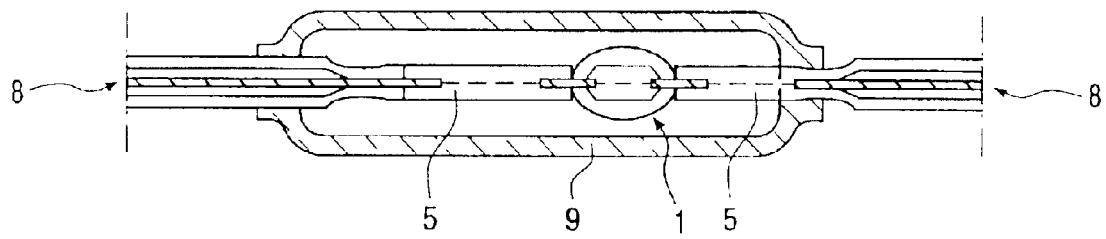

FIG. 6 diagrammatically shows a discharge lamp according to the invention with an outer envelope.

FIG. 1 diagrammatically shows the construction of a first high-pressure gas discharge lamp according to the invention. As is shown in FIG. 1(a), the lamp comprises a discharge vessel 1 of quartz glass which encloses a discharge space 2. The discharge space 2 is bounded by a bottom surface 10 which is in lowermost position in the operational position of the lamp, and an opposed upper wall 13, and further walls.

The discharge space is filled with a gas which is composed of a discharge gas (light generator) which emits the light radiation by means of excitation or discharge, and preferably a gas forming a voltage gradient, which gases may both be chosen from the group of metal halides.

The light-generating substances are, for example, sodium iodide and/or scandium iodide, and the voltage gradient forming substance used may be, for example, zinc iodide and/or other substances instead of mercury.

Alternatively or in addition to the voltage gradient forming substances, certain quantities of rare gases (for example xenon) may be introduced into the discharge space 2 so as to increase the gas pressure and thus the luminous efficacy and the burning voltage.

Free ends of electrodes 3, which are manufactured from a material with as high as possible a melting temperature, for example tungsten, extend into the discharge space 2 from mutually opposed sides thereof. The respective other ends of the electrodes 3 are each fastened to an electrically conductive plate or foil 4, in particular a molybdenum foil, by means of which an electrical connection is achieved between the outer contacts of the discharge lamp and the electrodes 3.

To ensure a vacuumtight closure of the locations 7 where the electrodes 3 project into the discharge space 2, the discharge vessel 1 in these regions merges into quartz glass portions (or pinches) 5 into which the portions of the electrodes 3 opposed to the free ends thereof as well as the electrically conductive foil 4 are embedded.

The pinches 5 are preferably arranged symmetrically with respect to the discharge vessel 1 and lie on the longitudinal axis thereof. This has the advantage that the outer dimensions of the outer envelope of the lamp according to the invention need not be changed, which is of particular importance for the use of these lamps in motor vehicle headlights. In addition, the manufacture of a lamp with symmetrical pinches is simpler and thus less expensive.

An arc discharge 6 (light arc) is excited between the tips of the electrodes 3 in the operational state of the lamp.

FIG. 1(b) is a cross-sectional view taken on the line A–B in FIG. 1(a). This representation again shows the discharge vessel 1 with the discharge space 2 and the electrodes 3, the bottom surface 10, and the upper wall 13. It is furthermore apparent from this Figure that the discharge vessel 1 has an external flattened portion 14 in the region opposed to the bottom surface 10, which flattened portion substantially contributes to a limitation of the specific heat capacity of this region of the discharge vessel, so that as little heat as possible is removed from the bottom surface 10.

As was noted above, the gas filling of the high-pressure gas discharge lamps according to the invention preferably comprises one or several suitable metal halides acting as a voltage gradient generator as a substitute for mercury. Since these substances have a comparatively low partial vapor pressure, however, it is necessary, for achieving a substantially equal lamp efficacy (or luminous flux) as well as a highest possible burning voltage, to influence the temperature balance in the discharge vessel 1, and in particular to raise the temperature of the coldest spot, i.e. of the bottom surface 10, so that a sufficient quantity of the light-generating substances, which accumulate in solid form on the bottom surface 10 when the lamp is switched off, enters the gaseous state in the discharge space 2 in the operational condition of the lamp.

It should obviously also be heeded here that the highest temperature building up at the upper wall 13 of the discharge space 2 must not become so high that a crystallization or devitrification of the discharge vessel 1 occurs, said vessel being made of quartz glass. This may be a problem because the region above the arc discharge 6 is particularly strongly heated owing to the strong convection within the discharge space.

These preconditions and requirements are fulfilled by the arrangement of the discharge space 2 shown in FIGS. 1(a), (b). As is apparent from the Figures, the bottom surface 10 has a comparatively small distance to the light arc 6 which is formed during operation. This distance should be preferably be smaller here than the distance between the light arc 6 and the location of the upper wall 13 of the discharge space 2. The distance to the bottom surface, however, should be at least so great that the electrodes 3 and the light arc 6 formed between them including its diffuse region are not interfered with or hampered.

The size and shape of the bottom surface 10 is furthermore chosen such that on the one hand the light-generating substance accumulates for a major portion on this bottom surface 10 when the lamp is switched off. On the other hand, the proximity of the bottom surface to the region between the electrode tips is chosen in particular in dependence on the nature and quantity of the light-generating substance such that the latter is sufficiently strongly heated by the arc discharge 6 when the lamp is switched on, so that it enters the gaseous state in a sufficient quantity and thus enhances the efficacy of the lamp. In dimensioning the bottom surface 10, it should be ensured that the initially arising molten light-generating substance does not cover the electrode tips or the arc discharge 6.

With the bottom surface 10 thus dimensioned and shaped, a lamp efficacy can be achieved in particular as has been possible until now essentially exclusively with gas fillings that comprise mercury. Furthermore, the spectral properties and the color point of the generated light also correspond substantially to those of lamps with mercury, which is of particular importance for the application in automobile technology.

The burning voltage of the lamp is also substantially increased thereby in comparison with known mercury-free lamps (and could be further increased through an increase in the electrode spacing and other measures).

The bottom surface 10 raised in the manner described does not lead to a further increase in the temperature of the hottest location of the discharge vessel 1, which is usually present opposite thereto at the upper wall 13, so that also the maximum thermal load on the lamp is not increased, and in particular a lumen maintenance comparable to that of discharge lamps with mercury is achieved.

The increase in the temperature of only the bottom surface 10 also achieves that the temperature drop across the wall of the discharge vessel 1, in particular between its upper and lower sides, is reduced, so that also the thermal stresses in the vessel are substantially smaller.

A further condition to be fulfilled by the construction of the bottom surface 10 consists in that the light-generating substances (or other deposited substances) collecting on the bottom surface 10 disappear substantially from the region of the bottom surface 10 lying below the electrode tips and below the arc discharge 6, where they would hamper the emission of light from the lamp owing to reflection and absorption. On the other hand, it should also be heeded in the construction of the bottom surface 10 that the migrating, non-gaseous light-generating substances cannot, at least not in a substantial quantity, reach the entry locations 7 of the electrodes 3 and thus enter the pinches 5, because they could cause damage through corrosion or similar effects there in the course of time.

In the first embodiment, this effect is substantially prevented by means of a suitable attunement between the quantity of the light-generating substance and the dimensions of the bottom surface 10, and in the second and third embodiments of the invention by means of the measures described below.

FIGS. 2(a) and 2(b) show the second embodiment in which identical components have been given the same reference numerals as in FIGS. 1(a) and (b), so that these components need not be described once more. In contrast to the first embodiment, the bottom surface 10 here has a first, raised region 11 which merges into respective second regions 12 in the directions of the entry locations 7 of the electrodes 3.

The surface area and the height of the first region 11, by means of which height it approaches the light arc 6, are here dimensioned substantially in dependence on the nature of the light-generating substance such that the light-generating substance accumulated on the first region in the switched-off state of the lamp enters the gaseous state at least substantially owing to heating after switching on of the lamp and indeed remains in the gaseous state in a quantity sufficient for lamp operation. This disappearance of the light-generating substances from the region 11 renders possible a substantially unhampered light emission from the lamp also through the region 11.

The second regions 12 are lowered with respect to the first region 11 to an extent as is necessary in dependence on the dimensioning of the first region 11 and on the quantity of the light-generating substance accumulating on the lower, bottom surface 10 in the switched-off state of the lamp, so as to ensure that the second regions 12 act as collector reservoirs for those portions of the light-generating substances which are not in the gas phase during operation of the high-pressure gas discharge lamp, but are present as a molten salt. Depending on the filling of the lamp with light-generating substances, in fact, a major proportion of the light-generating substances, for example 80% of the total quantity, may be present in the form of a molten salt during lamp operation. The second regions thus have the effect on the one hand of keeping said light-generating substances present in the form of molten salt during lamp operation away from the first region 11, where they would otherwise hamper the emission of light from the lamp. On the other hand, they also partly prevent the light-generating substances from reaching the entry locations 7 of the electrodes 3 upon switching-on of the lamp owing to the heating caused thereby and the ensuing movement of the substances in the direction of the entry locations 7.

The lowermost sections of the second regions 12 with respect to the first region 11 lie below the tips of the electrodes 3 and serve accordingly for accommodating quantities of said substance that have moved in a direction of the entry locations 7, so that these entry locations 7 remain at least partly protected from these substances. Overall, however, the temperature of the coldest spot is raised also in this case.

Finally, it is also apparent from FIG. 2(a) that the shape of the outer flattening 14 of the discharge vessel 1 in its longitudinal direction follows the gradient of the bottom surface 10 of the discharge space 2.

FIGS. 3(a), (b) show the third embodiment of the invention. In this Figure, again, the same or corresponding components have been given the same reference numerals as in FIGS. 1 and 2, so that these components need not be described once more.

In contrast to the second embodiment shown in FIGS. 2(a) and (b), the bottom surface 10 here has a symmetry with respect to the longitudinal axis of the discharge vessel 1. This is particularly clarified in the cross-sectional view of FIG. 3(b), in which the first raised portion 11 extends in longitudinal direction of the discharge vessel 1 below the electrodes 3 and a connecting line between them. The two second regions 12 extend parallel to the first region 11 and lie on either side of this region 11.

This arrangement of the bottom surface 10 again at least partly prevents light-generating substances which move towards the electrodes 3 from entering the entry locations 7 during switching-on of the lamp, because they slide substantially down into the second regions 12 during their migration and remain there, thus keeping the first region 11 free from its molten substances.

In this embodiment, again, the shape of the outer flattening 14 of the discharge vessel 1 follows the course of the bottom surface 10 of the discharge space 2.

FIGS. 4(a) and (b) show the fourth embodiment of the invention, for which identical or corresponding components have again been given the same reference numerals as in FIGS. 1 to 3, so that these components need not be described once more.

In contrast to the first to third embodiments, the upper wall 13 here has a curvature which extends in longitudinal direction of the discharge vessel 1 and which is directed upwards, substantially following the usually slightly upwardly curved gradient of the arc discharge 6. It is achieved thereby that the upper wall 13 is less strongly heated. The dimensioning of the bottom surface 10 is independent thereof and may be achieved in accordance with what is shown in FIGS. 1 to 3.

FIG. 5 shows a fifth embodiment of the invention, in which identical or corresponding components have again been given the same reference numerals as in FIGS. 1 and 2, so that these components need not be described once more. In contrast to the discharge lamps shown in FIGS. 1 and 2, the discharge vessel 1 is now constructed so as to be rotationally symmetrical around its longitudinal axis. This means that the bottom surface 10 extends over the entire inner circumference of the discharge space 2, so that also the upper wall 13 has the same shape (mirror-symmetrical) as the bottom surface 10.

This construction, which may be applied to all embodiments of FIGS. 1 and 2, has substantial advantages for manufacturing technology, and is simpler and cheaper to manufacture. A resulting stronger heating of that region of the discharge vessel 1 which is uppermost in the operational position may be acceptable especially if the lamp is designed, for example, for a comparatively low power or is cooled in its upper region.

Apart from this, the operation and the advantages of this embodiment are the same as those described above with reference to the other embodiments.

It can be achieved in all embodiments that the temperature of the bottom surface rises more evenly, i.e. by means of an additional coating comprising zirconium oxide ($ZrO_2$) and applied on the outer side of the discharge vessel opposite the bottom surface 10, because the coated regions heat up more strongly than the regions without coating.

Such a coating may also be applied to the outer side of the discharge vessel 1 in the regions of the pinches 5 in all embodiments for contributing to the effect that as few as possible light-generating substances—or other deposited substances—move into these regions, alternatively to or in addition to the measures described above.

FIG. 6, finally, shows a longitudinal section through an outer envelope 9 in which one of the discharge lamps according to the invention is present, as well as the external contacts 8 through which a supply voltage is fed to the electrodes 3.

To clarify the advantages and properties obtained with the discharge lamps according to the invention, the following comparative example will be given:

The starting point is a standard discharge vessel with a usual, i.e. not raised bottom surface, which vessel has a volume of approximately 27 μl and contains a gas filling of approximately 300 μg sodium/scandium iodide in a ratio of approximately 70% sodium iodide to approximately 30% scandium iodide by weight and a xenon pressure of approximately 620 mbar (preliminary pressure in the auxiliary volume) and 50 μg zinc iodide ($ZnJ_2$). This results in a luminous flux of approximately 2650 lm for a burning voltage of approximately 35 V.

In the second embodiment shown in FIGS. 2(a) and (b), in which the volume of the discharge space 2 is approximately 20 μl and the bottom surface 10 is raised by at most approximately 0.5 mm, the same gas filling results in a burning voltage of approximately 50 V and a luminous flux of approximately 3050 lm.

If the first embodiment shown in FIG. 1 is used with the same volume of the discharge space 2 (20 μl) and a bottom surface 10 raised by approximately 0.5 mm, but with the gas filling comprising no zinc iodide, but otherwise corresponding to the gas fillings described above, the result is a burning voltage of approximately 42 V and a luminous flux of approximately 3200 lm.

A considerable increase in the luminous flux and a clear rise in the burning voltage are accordingly obtained with the constructions of the discharge space 2 according to the invention.

It should finally be noted that the principle of the invention, by which the temperature of the coldest spot of the discharge vessel is raised, is obviously also applicable to lamps which do contain mercury and in which the environmental disadvantages inherent in mercury are accepted. In this case, such a temperature rise may, for example, serve to increase the luminous efficacy or, given the same luminous efficacy, to reduce the input power of the lamp.

What is claimed is:

1. A high pressure discharge lamp with a discharge vessel which encloses a discharge space with a light-generating substance and with a bottom surface which is in lowermost position in the operational position of the lamp, which bottom surface has a raised region and recessed regions, the discharge space having a long dimension and the discharge vessel having an exterior surface wherein;
   the bottom surface of the discharge space is curved along the long dimension, said raised region being near the center of said long dimension and said recessed regions being near the ends of the long dimension of the discharge space, and said discharge space further being enclosed by a top surface opposite said bottom surface, which is planar.

2. A high-pressure gas discharge lamp as claimed in claim 1, comprising pinches (5) which are arranged symmetrically with respect to the discharge vessel (1).

3. A high-pressure gas discharge lamp as claimed in claim 1, comprising a gas filling which is free from mercury.

4. A high-pressure gas discharge lamp as claimed in claim 3, which comprises a voltage gradient generator in the form of one or several metal halides in its gas filling.

5. A high-pressure gas discharge lamp as claimed in claim 4, wherein the voltage gradient generator comprises zinc iodide.

6. A high-pressure gas discharge lamp as claimed in claim 3, wherein the gas filling comprises quantities of rare gases, for raising the gas pressure and for enhancing the luminous efficacy of the lamp.

7. A high-pressure gas discharge lamp as claimed in claim 1, wherein the outer wall of the discharge vessel (1) opposed to the raised region of the bottom surface (11) is provided with a coating which comprises zirconium oxide ($ZrO_2$).

8. A high-pressure gas discharge lamp as claimed in claim 1, wherein the lamp has electrodes and pinches and wherein the outer wall of the discharge vessel (1) is provided with a coating comprising zirconium oxide ($ZrO_2$) in regions of entry locations (7) of at least one of the electrodes (3) and the pinches (5).

9. A lighting unit, in particular for motor vehicle headlights, with a high-pressure gas discharge lamp as claimed in claim 1.

10. A high-pressure gas discharge lamp as claimed in claim 1, said discharge space further being such that its shape in a plane perpendicular to the long dimension at the center of the long dimension is circular except for a straight line portion at the location of said bottom surface.

11. A high-pressure gas discharge lamp as claimed in claim 10, wherein the shape of said exterior surface of the discharge vessel at a bottom region is congruent with the shape of said bottom surface.

12. A high pressure discharge lamp with a discharge vessel which encloses a discharge space with a light-generating substance and with a bottom surface which is in lowermost position in the operational position of the lamp, which bottom surface has a raised region and recessed regions, the discharge space having a first long dimension and the discharge vessel having an exterior surface wherein;

the bottom surface of the discharge space is curved along a second dimension perpendicular to the long dimension, said raised region being near the center of said second dimension and said recessed regions being near the ends of said second dimension.

13. A high-pressure discharge lamp as claimed in claim 12, wherein the shape of the discharge vessel at a bottom region is congruent with the bottom of the discharge space.

* * * * *